(12) United States Patent
Johnson

(10) Patent No.: US 8,925,746 B2
(45) Date of Patent: Jan. 6, 2015

(54) MODULAR RACEWAY SYSTEM FOR ELECTRICAL COMPONENTS

(76) Inventor: Todd Johnson, Mankato, MN (US)

( * ) Notice: Subject to any disclaimer, the term of this patent is extended or adjusted under 35 U.S.C. 154(b) by 337 days.

(21) Appl. No.: 13/353,397

(22) Filed: Jan. 19, 2012

(65) Prior Publication Data
US 2012/0181395 A1    Jul. 19, 2012

Related U.S. Application Data

(60) Provisional application No. 61/434,288, filed on Jan. 19, 2011.

(51) Int. Cl.
*A47F 5/08* (2006.01)
*H02G 3/00* (2006.01)

(52) U.S. Cl.
CPC ...................................... *H02G 3/00* (2013.01)
USPC ........................................ 211/94.02; 248/49

(58) Field of Classification Search
USPC ............ 211/94.01, 94.02, 105.1, 106.1, 123; D8/377; 16/88, 94 D; 160/345; 248/49, 248/56, 65, 297.21, 475.1, 476, 481, 489, 248/495, 497, 917, 919–923
See application file for complete search history.

(56) References Cited

U.S. PATENT DOCUMENTS

| | | | | |
|---|---|---|---|---|
| 1,670,455 | A | * | 5/1928 | Kuhn .................................. 16/88 |
| 3,134,132 | A | * | 5/1964 | Graber .......................... 16/94 D |
| 3,555,750 | A | * | 1/1971 | Banse ................................ 52/97 |
| 3,786,171 | A | | 1/1974 | Shira |
| 5,162,614 | A | | 11/1992 | Bogiel et al. |
| 5,179,811 | A | | 1/1993 | Walker et al. |
| 5,299,947 | A | | 4/1994 | Barnard |
| 5,337,525 | A | | 8/1994 | Zaccai et al. |
| 5,357,053 | A | | 10/1994 | Manaras |
| 5,463,835 | A | | 11/1995 | Wood |
| 5,638,644 | A | * | 6/1997 | Bastian .......................... 52/36.6 |
| 6,180,878 | B1 | | 1/2001 | Gretz |
| 6,191,363 | B1 | | 2/2001 | Samuels |
| 6,380,486 | B1 | | 4/2002 | Hemingway et al. |
| 6,394,398 | B1 | * | 5/2002 | Reed et al. ....................... 248/57 |
| 6,477,818 | B1 | | 11/2002 | Jensen |
| 6,504,098 | B2 | | 1/2003 | Seamans |
| 6,792,877 | B2 | | 9/2004 | Gutgsell et al. |
| 6,910,307 | B1 | | 6/2005 | Maurer |
| 6,911,597 | B2 | | 6/2005 | Seamans et al. |
| 6,918,977 | B1 | | 7/2005 | Maurer |
| 7,200,970 | B2 | | 4/2007 | Koenig, Jr. et al. |
| 7,210,272 | B2 | | 5/2007 | Friday |
| 7,385,148 | B2 | | 6/2008 | Picard et al. |
| 7,878,476 | B2 | * | 2/2011 | Carson et al. .................. 248/429 |
| D640,674 | S | * | 6/2011 | van Alphen .................. D14/239 |
| 2009/0139943 | A1 | * | 6/2009 | Fernandez ................. 211/94.01 |

FOREIGN PATENT DOCUMENTS

EP    0 509 413 A2    10/1992
EP    1 223 649 A1    7/2002

* cited by examiner

*Primary Examiner* — Korie H Chan
(74) *Attorney, Agent, or Firm* — Meister Seelig & Fein LLP

(57) ABSTRACT

A the Modular Raceway System For Electrical Components is provided that includes horizontal members (10) to accommodate the attachment of trim (30), the attachment of vertical members (20) containing slots (22) for connecting the attachment brackets (40) and other brackets used to secure electronic devices (26) or other objects. Used as a means for concealing wiring (16) and minimizing the amount of holes required for wall (24) connection points in a finished room.

10 Claims, 9 Drawing Sheets

MODULAR RACEWAY SYSTEM FOR ELECTRICAL COMPONENTS

RELATED APPLICATION

This application claims priority to U.S. Provisional Application No. 61/434,288 filed Jan. 19, 2011, which is hereby incorporated herein by reference.

BACKGROUND OF THE INVENTION

The present application relates to an apparatus for concealing wiring and for installing electrical components, an more particularly, an apparatus suitable for surface installing electrical components in a finished room.

Digital electronics, such as stereo sound systems, flat screen televisions, accessory lighting and other devices have become very popular. Existing homes and commercial businesses are faced with the problem of how to successfully implement the use of these devices in existing room space. The use of these devices typically leads to a tangled mass of wires that are unsightly and unsafe. As well, drilling of holes in walls to install a digital device is an extreme challenge. Often times, there is no structural material behind the wall at the appropriate location. This limits where devices can be placed.

Often times stringing the wires across an open surface by stapling is pursued. When this is done, on a wall or floor, this proves an ineffective solution as the wires remain in view and are not protected. Setting devices on tables uses up floor space that is often times needed for other uses. This is also an ineffective solution.

Other attempted solutions include using various covers for concealing high voltage wiring. These attempts fail in not being of adequate size or shape to accommodate the wiring needs of digital electronics. These types of covers are completely un-effective in regard to mounting a device, as they are often times not structural in nature.

Accordingly there is a need for an apparatus and method for concealing wiring and at the same time providing support for surface installing electrical components in a finished room.

SUMMARY OF THE INVENTION

In one aspect, a modular raceway system for electrical components is provided that includes a horizontal member having a ledge extending horizontally through at least a portion of the horizontal member; and at least one vertical member that detachably hangs from the ledge of the horizontal member.

In one embodiment, the horizontal member has a generally G shaped cross section with an opening therein facing downward.

In one embodiment, the generally G shaped cross section provides an outward face with a plurality of openings therein to accommodate the at least one member.

In one embodiment, the at least one vertical member has an outward face that fits within the outward face of the horizontal member.

In one embodiment, the system includes trim that removably attaches to the outward face of the horizontal member.

In one embodiment, the system includes at least one attachment bracket removably attachable to the at least one vertical component at a plurality of locations along a length of the at least one vertical component.

In one embodiment, the at least one vertical component has a chase extending vertically therein and a plurality of holes in communication with the chase for wiring to pass through the at least one vertical component and outward from at least one of the plurality of holes.

In one embodiment, the horizontal member has a generally G shaped cross section that provides an outward face with a plurality of openings therein to accommodate the at least one vertical member and a horizontal section with corresponding openings therein for wires to pass through the corresponding openings into the chase of the at least one vertical member.

In one aspect, a corresponding method is provided that includes installing on a wall of a room a horizontal member having a ledge extending horizontally through at least a portion of the horizontal member; and hanging detachably at least one vertical member from the ledge of the horizontal member.

In one embodiment, the method includes removably installing trim to the outward face of the horizontal member.

In one embodiment, the method includes removably attaching at least one attachment bracket to the at least one vertical component, wherein the attachment bracket is attachable to a plurality of locations along a length of the at least one vertical component.

In one embodiment, the at least one vertical component has a chase extending vertically therein and a plurality of holes in communication with the chase, the method includes passing wiring through the at least one vertical component and outward from at least one of the plurality of holes.

In one embodiment, the method includes the horizontal member has a generally G shaped cross section that provides an outward face with a plurality of openings therein to accommodate the at least one vertical member and a horizontal section with corresponding openings therein, the method includes passing wires through the corresponding openings into the chase of the at least one vertical member.

Additional aspects of the present invention will be apparent in view of the description which follows.

DETAILED DESCRIPTION OF THE INVENTION

Figure 1:
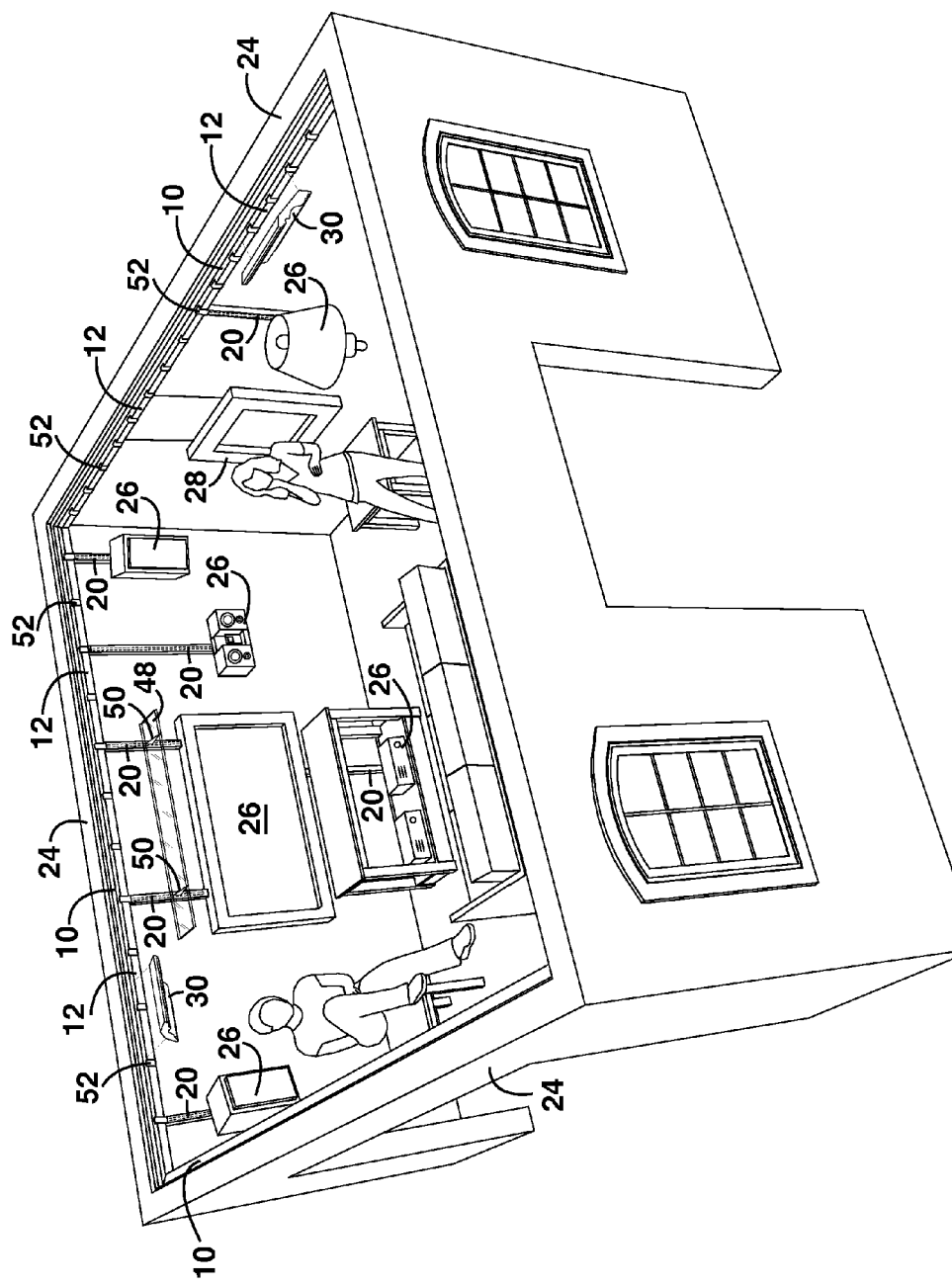
FIG. 1 is a perspective view of the Modular Raceway System For Electrical Components, in use, in a finished room.

Referring to FIG. 1 a perspective view of the Modular Raceway System For Electrical Components according to at least one embodiment, in use, in a finished room. An infinite variety of configurations are achieved using this system. Modular components can be manufactured or cut to any length required. The system generally includes horizontal members 10 that are first installed and fastened by fasteners 38 to walls 24 in the preferred embodiment. The horizontal members 10 are installed in the upper most portion of the walls 24 at a suitable distance from the ceiling to accommodate the fitting of selected trim 30.

The system further includes vertical members 20 that are then hung from the horizontal members 10 by inserting vertical member 20 into openings 52 in the horizontal members 10. Gravity holds vertical members 20 in place relative to the point at which the vertical member 20 hangs from horizontal member 10 connected within opening 52. The openings 52 preferably include a ledge for hooks in the vertical members to detachably attach to. Vertical members 20 accommodate the secure connection of attachment brackets 40 via slots 22 in the vertical members 20. Wiring 16 may be installed in conjunction with horizontal members 10 and vertical members 20. Attachment brackets 40 have various holes to allow for wiring 16 and fasteners 38 to connect electronic devices 26 to attachment brackets 40.

Opening 52 may be of any dimension as to allow for horizontal movement of vertical member 20. Vertical member 20 may be fitted with bearings, or other means, to allow it to move horizontally along horizontal member 10. Horizontal member 10 may be fitted with bearings or other means to facilitate movement of vertical member 20. The horizontal members 10 may include a plurality of openings 52, equally spaced or otherwise. This beneficially allows multiple hanging elements to be installed throughout a room as shown.

Various electronic devices 26, such as televisions, stereo sound systems, lamps and other electronic devices 26 may be connected to the modular raceway system. Other non electrical devices can also be connected to the raceway system. One example of this is shelving 48 which sits on shelf brackets 50 connected to vertical member 20 via slots 22.

Trim 30 attaches to horizontal member 10 to completely conceal the wiring 16 located near or within horizontal member 10.

Figure 2:
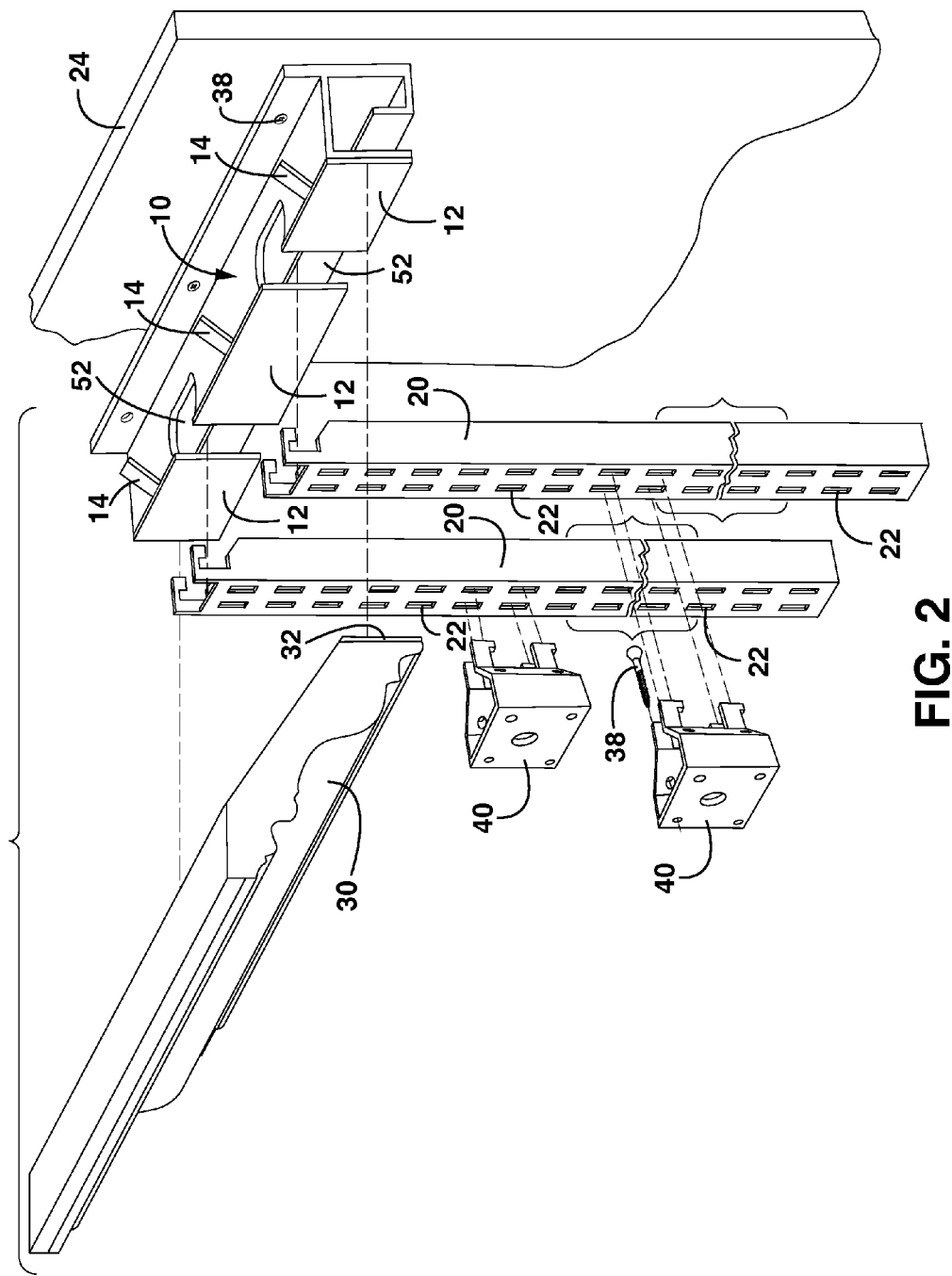
FIG. 2 is an exploded view of system components according to at least one embodiment of the systems disclosed herein.
Figure 3:
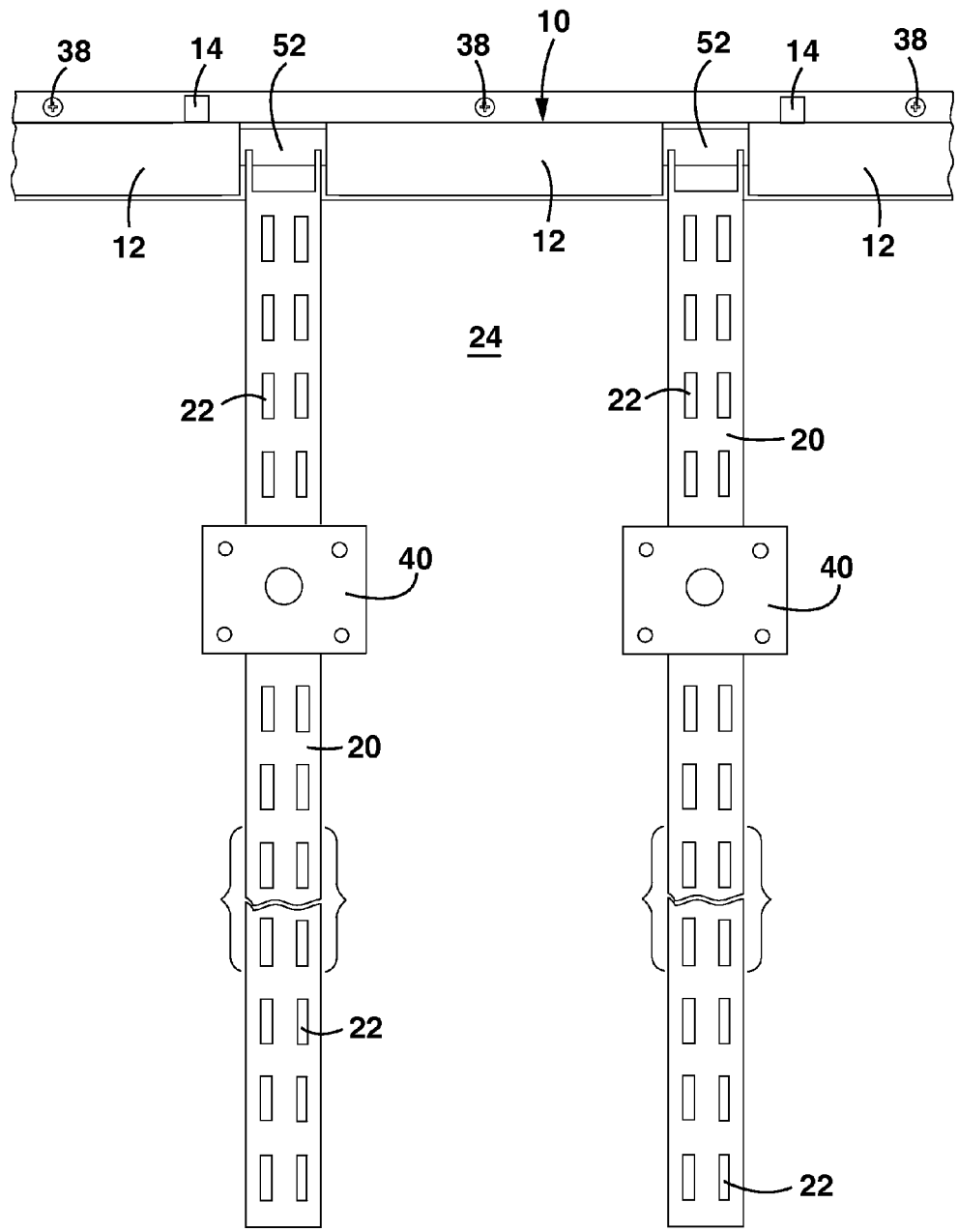
FIG. 3 is a front elevation view of system components according to at least one embodiment of the systems disclosed herein.

FIG. 2 is an exploded view of system components according to one embodiment and more clearly discloses the components thus described. As well, FIG. 3 is a front elevation view of some system components. These views exhibit magnets 12, in the preferred embodiment, attached to horizontal member 10. Attachment surface 32 is made of ferrous metal or other magnetic material and aligns with magnets 12 for the trim 30 to removeably connect with horizontal member 10. Other connection devices could be used as well such as re-useable adhesives, hook and loop fasteners, other mechanical connectors or ferrous metal surfaces. In one embodiment, the horizontal member 10 has a G shaped cross section with the opening facing downward. The G shape cross section provides the ledge for hanging the vertical members 20 therefrom. Moreover, the ledge is exposed within the openings 52 so that the outward face of the vertical members 20 fits within the face of the horizontal member 12.

Figure 4:
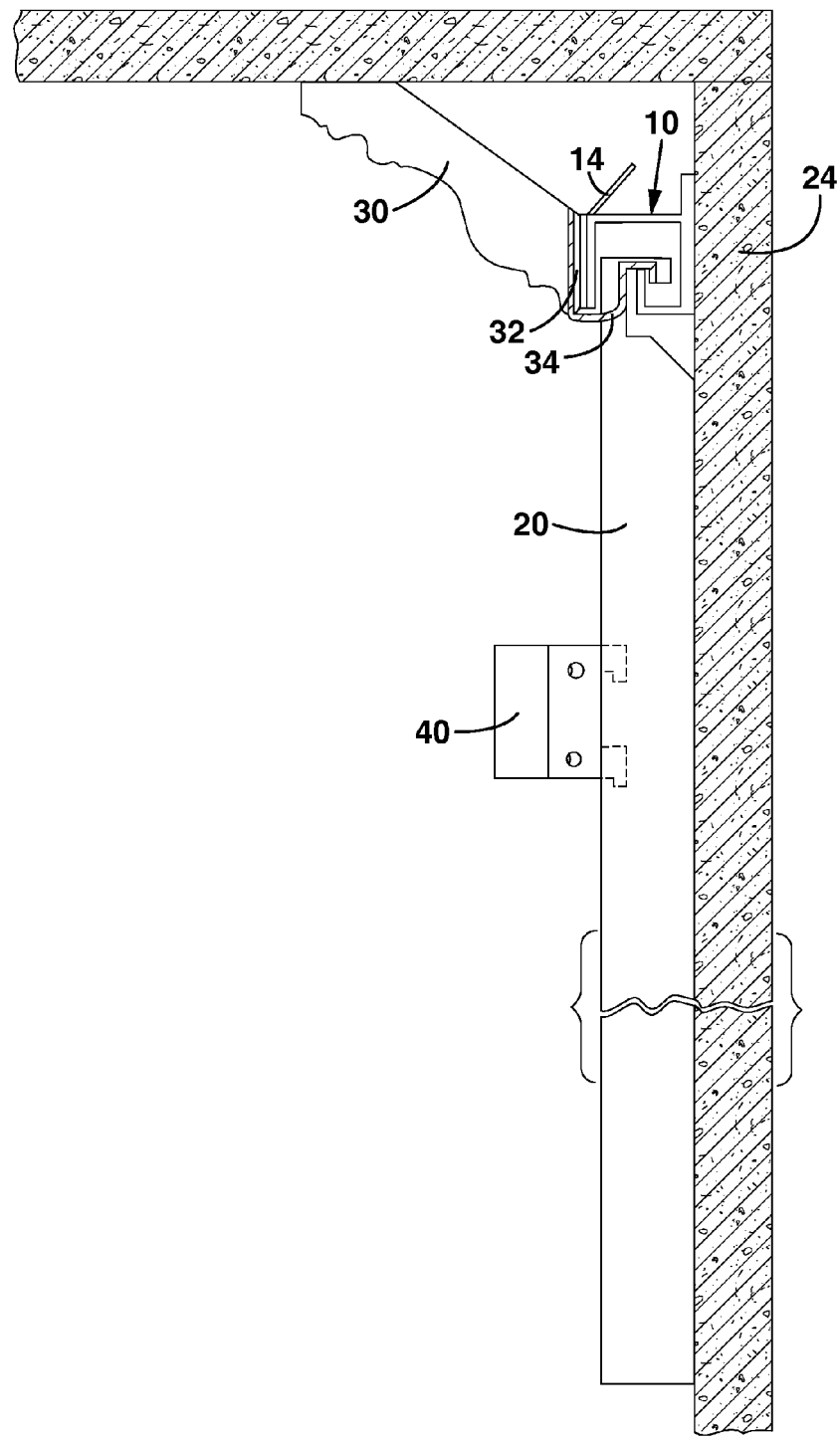
FIG. 4 is a side elevation view of system components according to at least one embodiment of the systems disclosed herein.

FIG. 4 is a side elevation view of some components in use. Further disclosed is safety strap 34. Safety strap 34 makes a positive connection with trim 30 at two or more points on each piece of trim 30, used in an installation. Safety strap 34 makes a gravity connection with horizontal member 10 and facilitates the servicing of wiring 16 by allowing a section of trim 30 to hang in a downward position detached from magnets 12. Also, if some event such as serious vibration dislodges trim 30 it does not fall to the floor and remains secure in the vicinity of the ceiling by safety strap 34.

Figure 5:
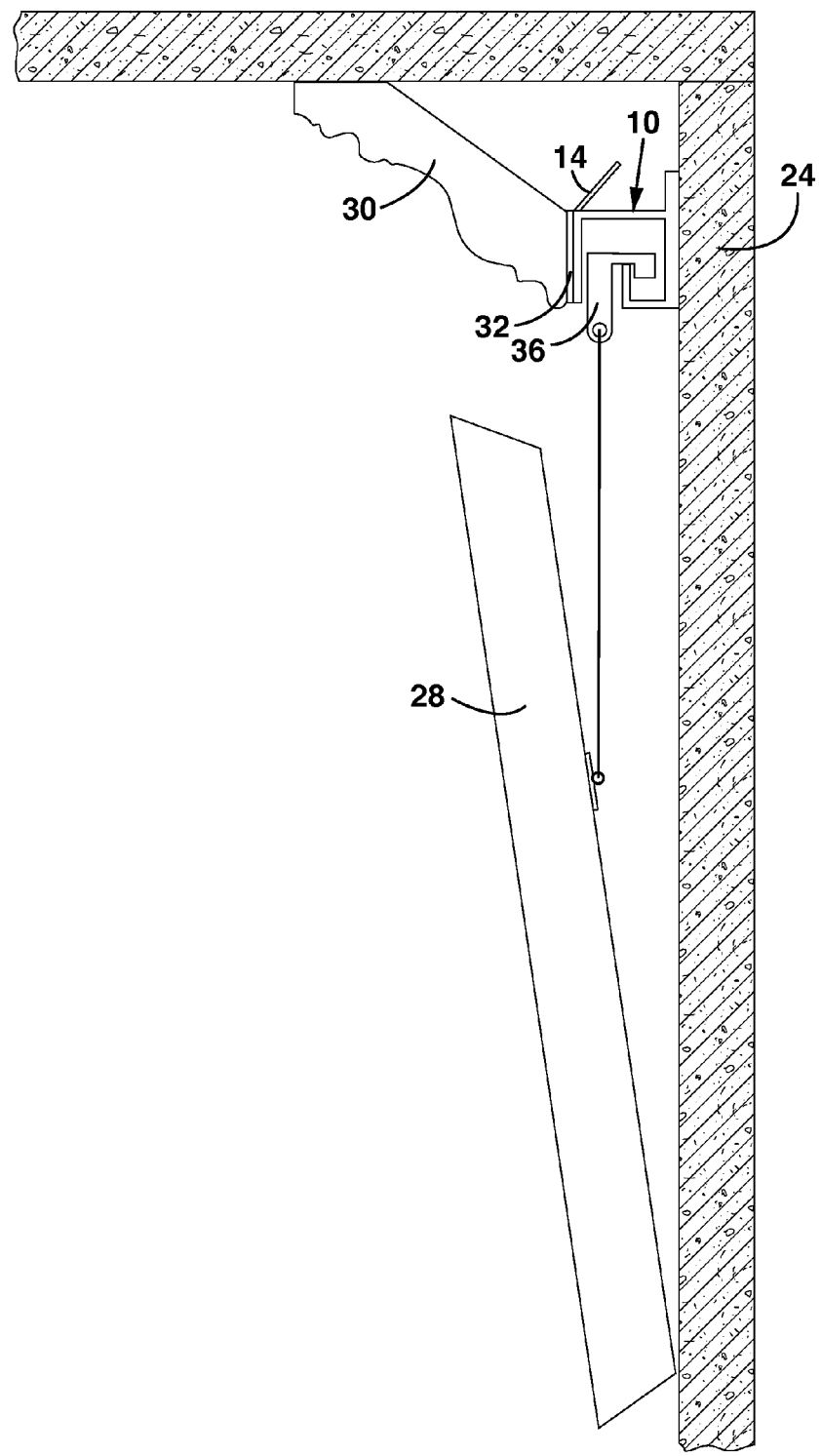
FIG. 5 is another side elevation view of system components according to at least one embodiment of the systems disclosed herein.

FIG. 5 is another side elevation view of other components in use. A hanger 36 facilitates the attachment of framed pictures 28 and other ornamental objects and devices.

Figure 6:
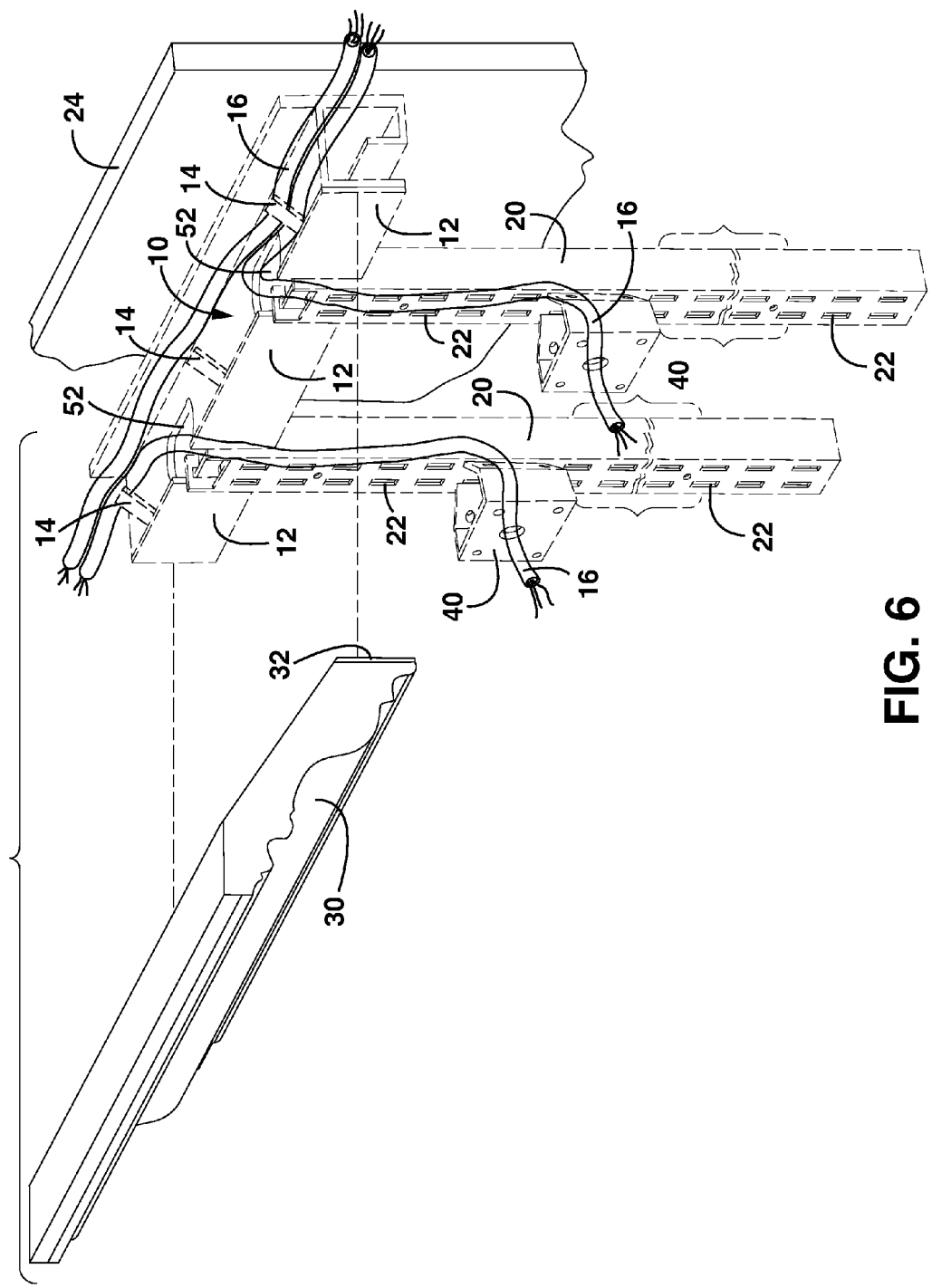
FIG. 6 is another view showing wires concealed within a system according to at least one embodiment of the systems disclosed herein.

FIG. 6 is another view disclosing the use of wires in the system. Horizontal members 10, vertical members 20 and attachment brackets 40 are shown in phantom lines for clarity of disclosure.

Figure 7:
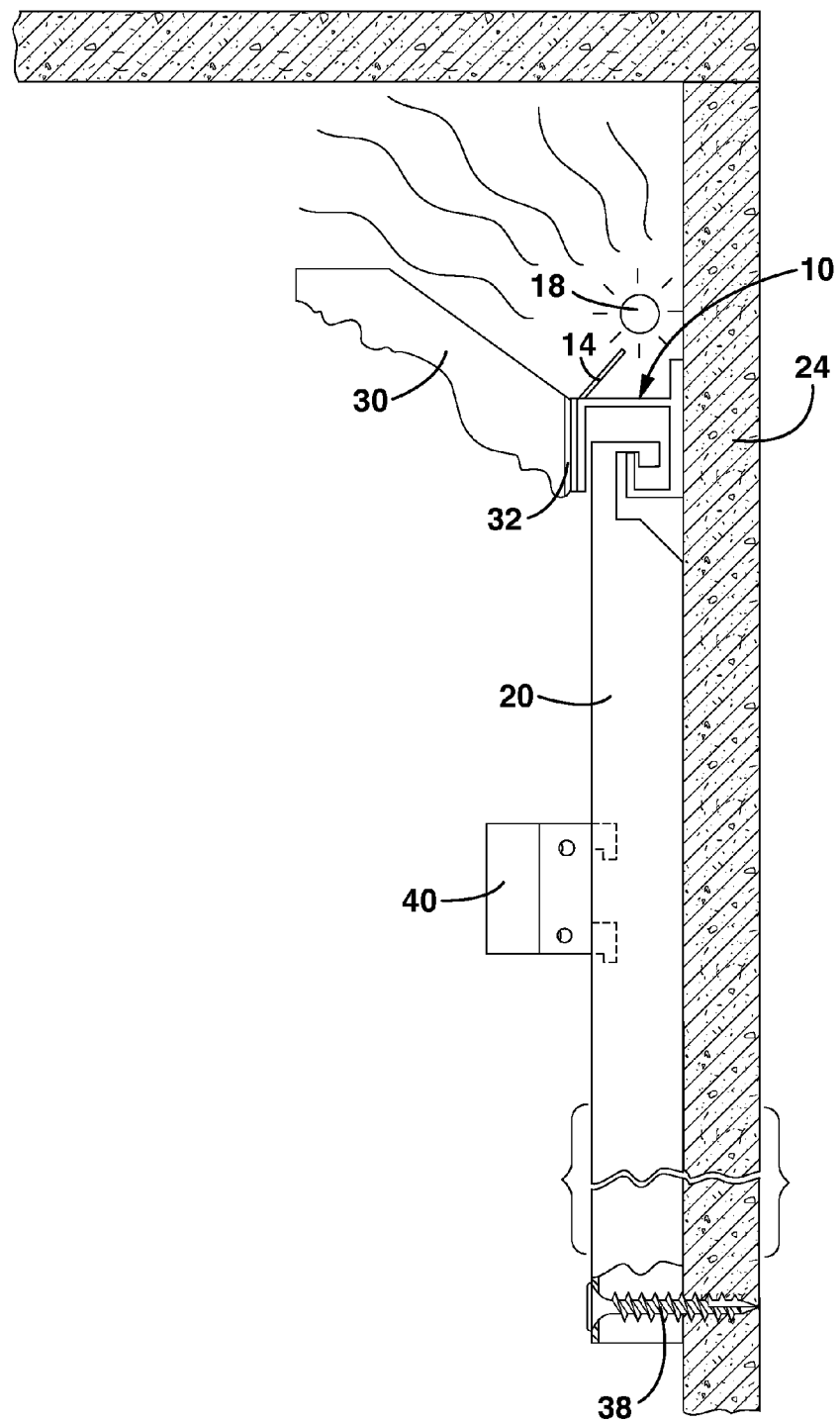
FIG. 7 is another side view showing the system according to at least one embodiment in use with lighting.

FIG. 7 is another side view disclosing the use of lighting in the system. Lighting 18 may or may not be used in the raceway system. In this view, horizontal member 10 is installed at a location further distant from the ceiling to allow for light to escape between the top of trim 30 and the ceiling. Any type of lighting reasonable to be included in the space allowed can be used. A fastener 38 can be used at any point in the system where stabilization may be required.

Figure 8:
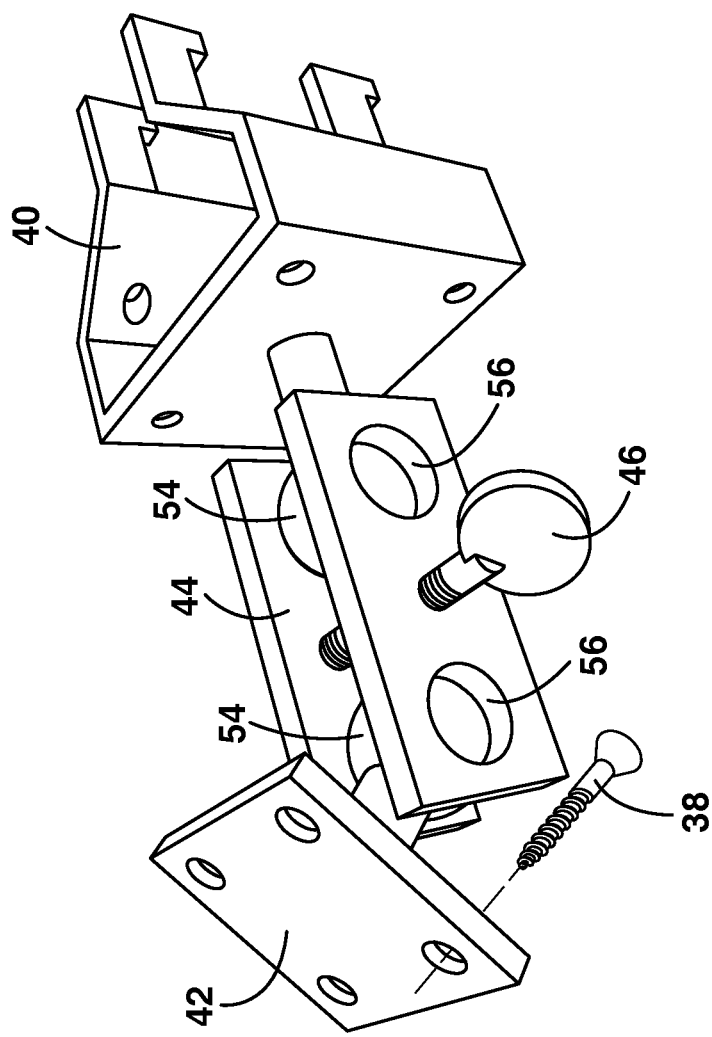
FIG. 8 is a perspective view of a system component.

FIG. 8 is a perspective view of another system component. Attachment bracket 40 is further enhanced by the addition of coupling bracket 44 and adjustable bracket 42. Sockets 56 in coupling bracket 44 allow for balls 54 to adjustably move and be fixed in a secure position by the use of thumbscrew 46. Attachment bracket 40 can also be connected to vertical member 20 in a fashion other than slots 22. Such as, being able to movably slide in a vertical fashion by griping the sides of vertical member 20 or by the use of bearings or other means.

Figure 9:
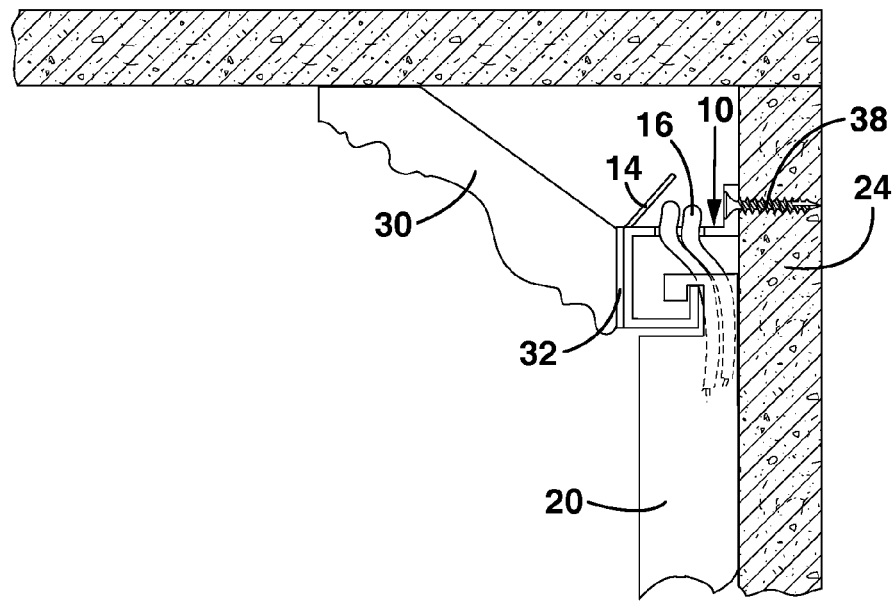
FIG. 9 is a side elevation view of a second embodiment of a system disclosed herein.

FIG. 9 is a side elevation view of a second embodiment of the system. In this embodiment horizontal member 10 and vertical member 20 have modified profiles to allow the members to couple in a configuration allowing a modified assembly of the components as they hook together.

Figure 10:
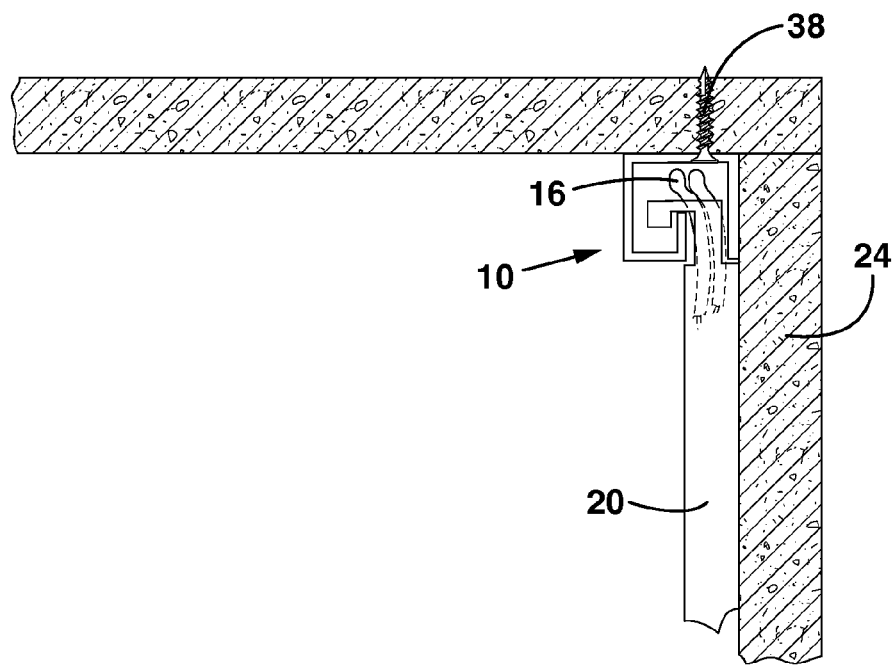
FIG. 10 is a side elevation view of a third embodiment of a system disclosed herein.

FIG. 10 is a side elevation view of a third embodiment of the system. In this embodiment horizontal member 10 and vertical member 20 have modified profiles to allow the members to couple in another configuration, allowing a modified assembly of the components as they hook together. This embodiment is fit tight to the ceiling allowing horizontal member 10 to also serve as a trim component that may or may not be finished at its visible sides.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A modular raceway system for electrical components comprising:

a horizontal member having a ledge extending horizontally through at least a portion of the horizontal member, the horizontal member has a generally G shaped cross section that provides an outward face with a plurality of openings therein to accommodate at least one vertical member and a horizontal section with corresponding openings therein for wires to pass through the corresponding openings into a chase of the at least one vertical member; and the at least one vertical member detachably hangs from the ledge of the horizontal member, the at least one vertical member comprising the chase extending vertically therein and a plurality of holes in communication with the chase for wiring to pass through the at least one vertical member and outward from at least one of the plurality of holes.

2. The system of claim 1, wherein the at least one vertical member has an outward face that fits within the outward face of the horizontal member.

3. The system of claim 2, comprising trim that removably attaches to the outward face of the horizontal member.

4. The system of claim 1, comprising at least one attachment bracket removably attachable to the at least one vertical member at a plurality of locations along a length of the at least one vertical member.

5. A method for installing electrical components, the method comprising:

installing on a wall of a room a horizontal member having a ledge extending horizontally through at least a portion of the horizontal member, the horizontal member has a generally G shaped cross section with an opening therein facing downward, wherein the generally G shaped cross section provides an outward face with a plurality of openings, installing at least one vertical member into one of the plurality of openings of the outward face; and hanging detachably the at least one vertical member from the ledge of the horizontal member.

6. The method of claim 5, wherein the at least one vertical member has an outward face that fits within the outward face of the horizontal member.

7. The method of claim 6, comprising removably installing trim to the outward face of the horizontal member.

8. The method of claim 5, removably attaching at least one attachment bracket to the at least one vertical member, wherein the attachment bracket is attachable to a plurality of locations along a length of the at least one vertical member.

9. The method of claim 5, wherein the at least one vertical member has a chase extending vertically therein and a plurality of holes in communication with the chase, the method comprising passing wiring through the at least one vertical member and outward from at least one of the plurality of holes.

10. The method of claim 9, wherein the horizontal member has a horizontal section with openings therein corresponding to the plurality of openings of the outward face, the method comprising passing wires through the corresponding openings into the chase of the at least one vertical member.

* * * * *